(12) United States Patent
Kristinsson et al.

(10) Patent No.: US 8,386,091 B2
(45) Date of Patent: Feb. 26, 2013

(54) METHODS AND APPARATUS FOR DYNAMIC POWERTRAIN MANAGEMENT

(75) Inventors: Johannes Geir Kristinsson, Ann Arbor, MI (US); Ryan Abraham McGee, Ann Arbor, MI (US); Fling Tseng, Ann Arbor, MI (US); Dimitar Petrov Filev, Novi, MI (US); Anthony Mark Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/103,539

(22) Filed: May 9, 2011

(65) Prior Publication Data

US 2011/0270468 A1 Nov. 3, 2011

(51) Int. Cl.
 *G05D 1/00* (2006.01)
(52) U.S. Cl. ............................. 701/2; 701/70
(58) Field of Classification Search .................. 701/123, 701/1, 33, 36, 213, 65, 99, 43, 54, 48, 101, 701/110, 70; 705/13; 180/338; 709/203, 709/208, 212, 213, 217–219, 238, 248; 714/4.1; 73/114.52–114.54
 See application file for complete search history.

(56) References Cited

U.S. PATENT DOCUMENTS

| | | | | |
|---|---|---|---|---|
| 6,484,088 | B1* | 11/2002 | Reimer | 701/123 |
| 6,988,033 | B1* | 1/2006 | Lowrey et al. | 701/123 |
| 7,398,147 | B2* | 7/2008 | Kozarekar et al. | 701/101 |
| 7,925,426 | B2* | 4/2011 | Koebler et al. | 701/123 |
| 8,050,856 | B2* | 11/2011 | Duty et al. | 701/123 |
| 2004/0034460 | A1* | 2/2004 | Folkerts et al. | 701/54 |
| 2004/0093264 | A1* | 5/2004 | Shimizu | 705/13 |
| 2006/0287795 | A1* | 12/2006 | Samad et al. | 701/54 |
| 2007/0027593 | A1* | 2/2007 | Shah et al. | 701/30 |
| 2008/0059035 | A1* | 3/2008 | Siddiqui et al. | 701/93 |
| 2008/0295586 | A1* | 12/2008 | Fosseen | 73/114.14 |
| 2009/0099724 | A1* | 4/2009 | Kranz et al. | 701/35 |
| 2010/0262321 | A1* | 10/2010 | Daum et al. | 701/20 |
| 2010/0324752 | A1* | 12/2010 | Suganuma et al. | 701/1 |
| 2011/0022197 | A1* | 1/2011 | Kultgen, II | 700/86 |
| 2011/0054768 | A1* | 3/2011 | Sullivan | 701/123 |
| 2011/0106375 | A1* | 5/2011 | Gurusamy Sundaram | 701/33 |
| 2011/0130905 | A1* | 6/2011 | Mayer | 701/22 |
| 2011/0166739 | A1* | 7/2011 | Oesterling | 701/30 |
| 2011/0166773 | A1* | 7/2011 | Raz et al. | 701/123 |
| 2011/0234427 | A1* | 9/2011 | Ingram et al. | 340/995.1 |
| 2011/0313647 | A1* | 12/2011 | Koebler et al. | 701/123 |

OTHER PUBLICATIONS

Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).

(Continued)

*Primary Examiner* — Thomas Black
*Assistant Examiner* — Marthe Marc-Coleman
(74) *Attorney, Agent, or Firm* — David B. Kelley; Brooks Kushman P.C.

(57) ABSTRACT

A computer-implemented method includes determining that a vehicle powertrain feature is engaged. The method further includes relaying, to a remote computing source, a request for a computation to be performed relating to the engaged powertrain feature. The method additionally includes receiving a result of the computation at a vehicle computing system and transferring the result of the computation to a powertrain for use in controlling the powertrain feature.

17 Claims, 6 Drawing Sheets

OTHER PUBLICATIONS

Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

* cited by examiner

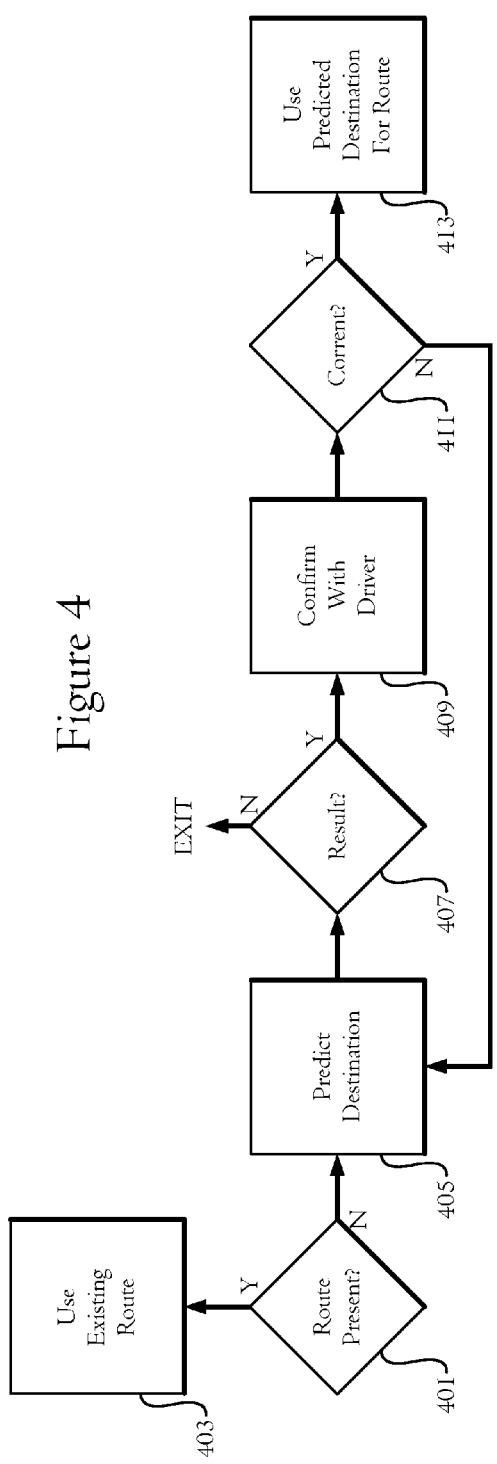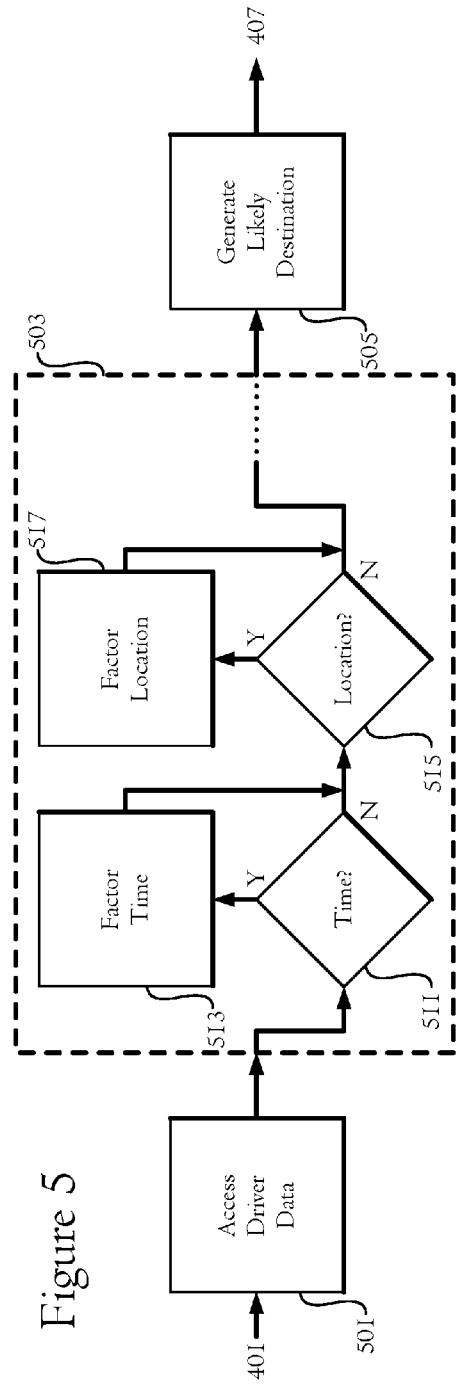
Figure 4
Figure 5

METHODS AND APPARATUS FOR DYNAMIC POWERTRAIN MANAGEMENT

TECHNICAL FIELD

The illustrative embodiments generally relate to methods and apparatus for dynamic powertrain management.

BACKGROUND

Many vehicles on the road today operate as individual systems. As vehicles get ever more complex, however, they also become ever more computerized. Computers have worked their way into many aspects of vehicle technology, although their presence is more prevalent in Infotainment Systems.

Vehicles are traditionally compartmentalized into separate operational areas, such as, but not limited to, Infotainment and Climate Control, Chassis and Body systems, Active Safety and Powertrain. While all areas have seen massive development over the last several decades, Infotainment is primarily the only system to integrate external interaction, with remote sources like the internet, and nearby wireless devices such as phones and PDAs.

Integration of data from outside sources with other aspects of vehicle control, however, is largely unpracticed. Certain systems may be optimizable with the proper data, but typically this will require access to large data-sources that are dynamic and up-to-date. Also, optimization calculations can be intensive, and it may be the case that the limited resources available to a vehicle computing system are not capable of handling the computations needed for system optimization.

Integration of cloud based systems with vehicle control systems can be problematic. For example, a powertrain control system is a control system operating continually and distributed over a limited set of Electronic Control Units (ECUs) in a tightly scheduled real-time environment with low latencies and fast communication. Internet systems, on the other hand, are often made up of independent hosts with comparatively huge computation capacity operating in an event driven paradigm (i.e., computation on demand, as opposed to continuous). Mobile communication from a vehicle computing system to an internet system is comparatively slow, with high and varying latency and lost packets that can wreak havoc on processes requiring a constant data feed.

SUMMARY

In a first illustrative embodiment, a computer-implemented method includes determining that a vehicle powertrain feature is engaged. The illustrative method further includes relaying, to a remote computing source, a request for a computation to be performed relating to the engaged powertrain feature. The illustrative method additionally includes receiving a result of the computation at a vehicle computing system and transferring the result of the computation to a powertrain for use in controlling the powertrain feature.

In a second illustrative example, a system includes a vehicle computing system operable to communicate with at least a remote server to obtain cloud based computing services and a remote server operable to receive information from and send information to the vehicle computing system.

In this illustrative example, the vehicle computing system is operable to determine that a vehicle powertrain feature is engaged. The vehicle computing system is further operable to relay, to a remote computing source, a request for a computation to be performed relating to the engaged powertrain feature. The vehicle computing system is also operable to receive a result of the computation at a vehicle computing system.

Additionally, in this example, the vehicle computing system is operable to transfer the result of the computation to a powertrain for use in controlling the powertrain feature.

In a third illustrative embodiment, a computer readable storage medium stores instructions that, when executed, cause a vehicle computing system to perform the method including determining that a vehicle powertrain feature is engaged. The illustrative method also includes relaying, to a remote computing source, a request for a computation to be performed relating to the engaged powertrain feature. The illustrative method additionally includes receiving a result of the computation at a vehicle computing system. Also, the illustrative method includes transferring the result of the computation to a powertrain for use in controlling the powertrain feature.

BRIEF DESCRIPTION OF THE DRAWINGS

FIG. 4 shows an illustrative example of a process for obtaining route information when the user has not input a particular route; and FIG. 5 shows one illustrative example of a prediction process.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
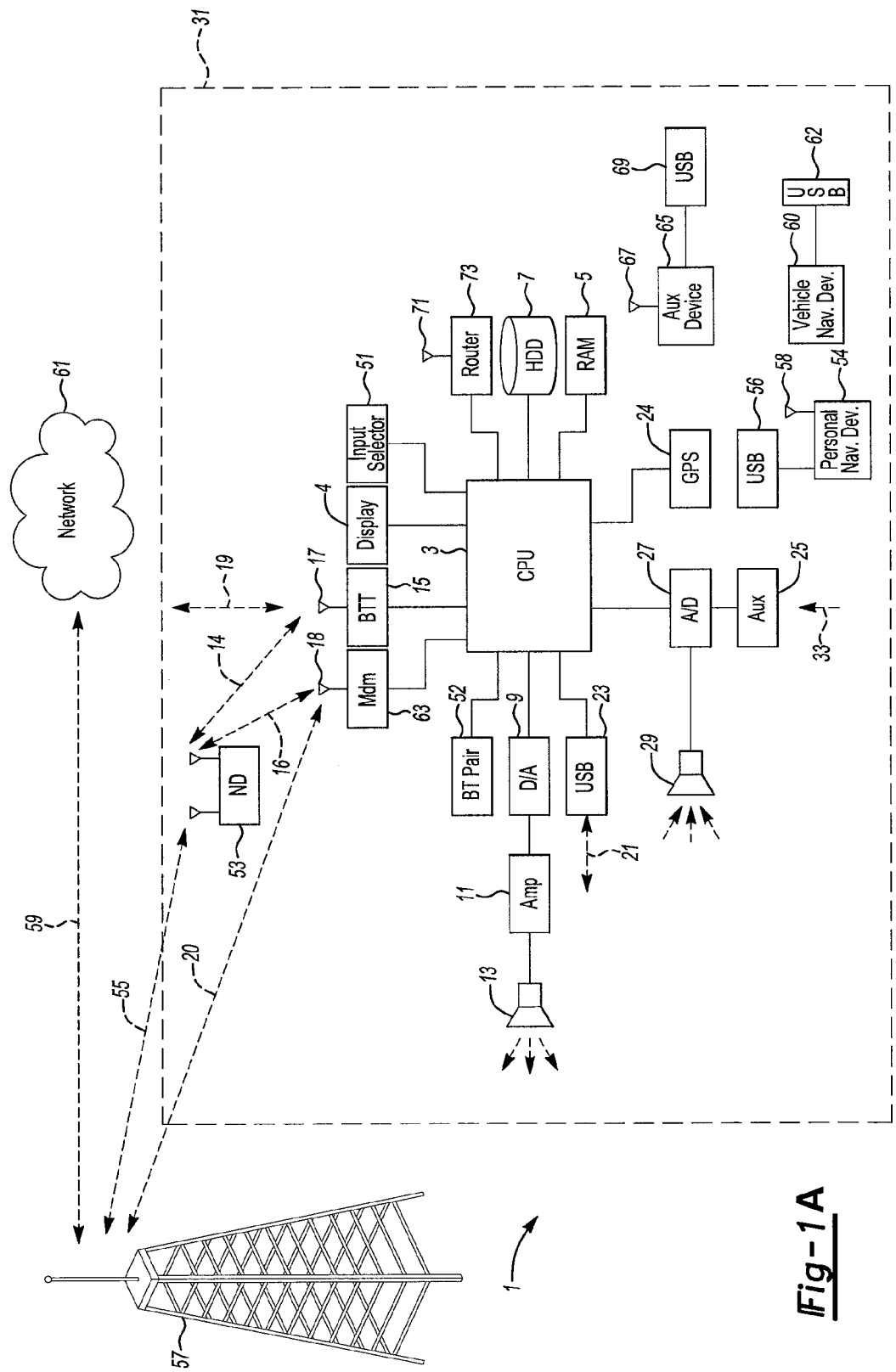
FIG. 1A shows an illustrative example of a vehicle computing system.

FIG. 1A illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1A, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users.

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In the illustrative embodiments, an on-board Vehicle-to-Cloud (V2C) implementation is introduced. The V2C communicates with a powertrain using local communication channels, such as, but not limited to, a CAN bus, in the same manner as other ECUs. The V2C also can communicate with cloud based computing services over mobile communication channels. In at least one embodiment, the V2C is more than a simple relay, it actively processes and converts data from one system to be fed to another, and is capable of error handling.

For example, without limitation, a powertrain may preferably receive constant or near constant instructions from an optimization source. Since it may be difficult to relay powertrain needs to a remote system, optimize remotely, receive the return information and deliver it to the powertrain on such a time-critical basis, the V2C may receive an optimization strategy for a certain portion of a route from the cloud, convert it to a locally understood language (if needed) and relay instructions as requested from or needed by the powertrain.

Figure 1B:
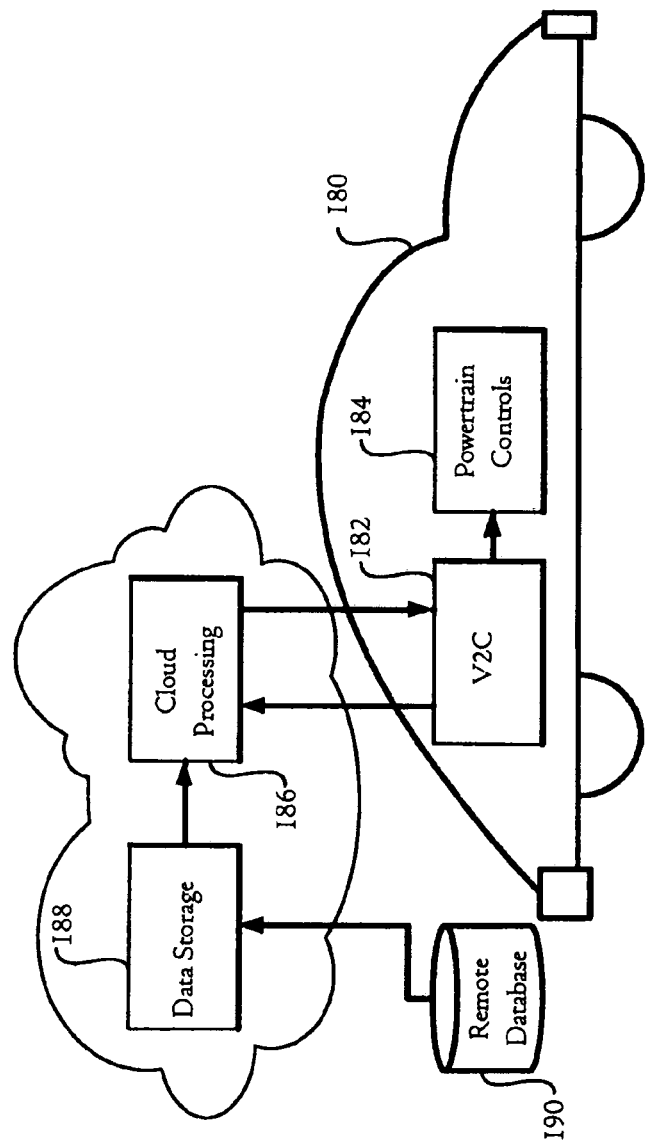
FIG. 1B shows one example of a vehicle computing system (VCS) in communication with the cloud.

FIG. 1B shows one example of a vehicle computing system (VCS) in communication with the cloud. In this example, a vehicle 180 has both a vehicle-to-cloud (V2C) system 182 and a powertrain control system 184 contained therein. The V2C system allows the driver to request remote computations from the cloud. In this illustrative example, the remote computation may relate to, for example, an intended destination as predicted by a prediction process executed in remote, cloud-based processing 186. In this example, the prediction process may draw on one or more remote resources, such as a database 190 or other cloud-based data resources 188. The prediction process is described in more detail with respect to FIGS. 4 and 5.

Figure 1C:
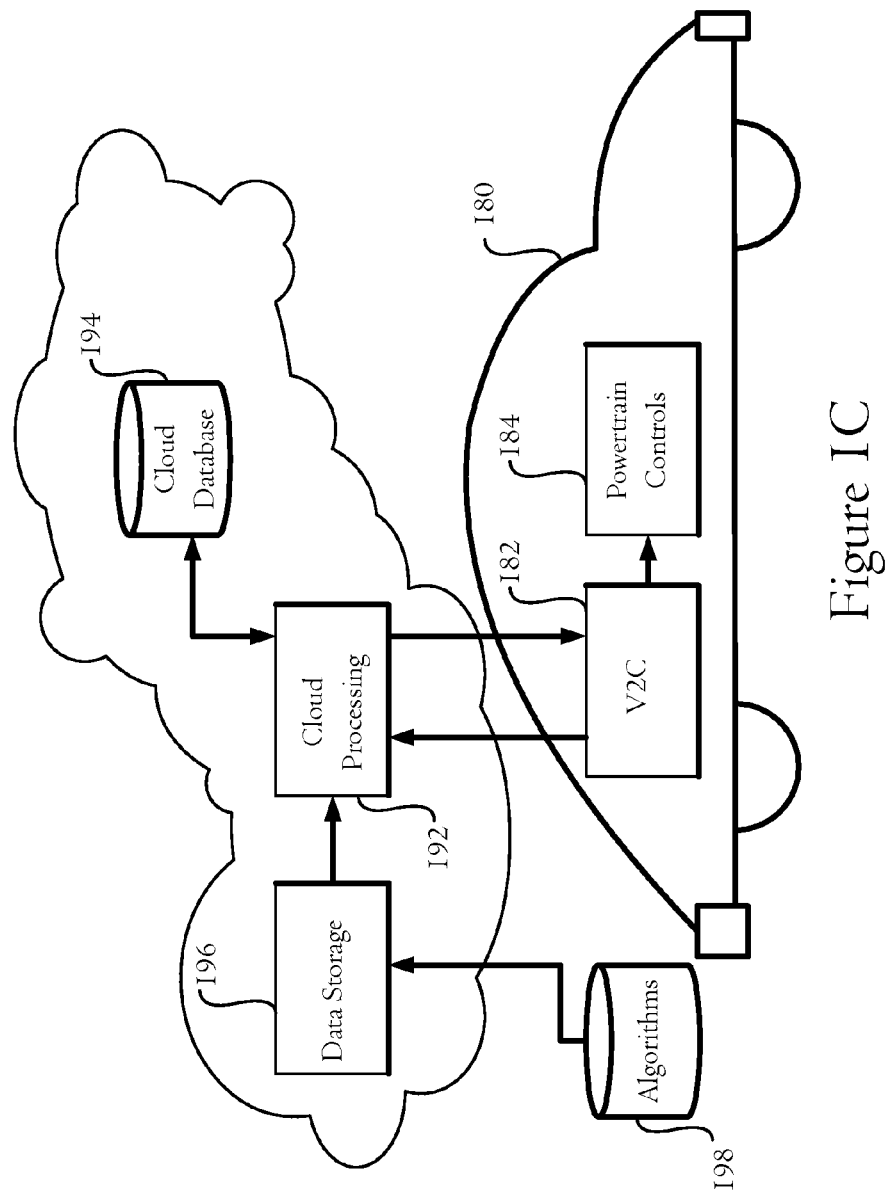
FIG. 1C shows another example of an illustrative vehicle-cloud system.

FIG. 1C shows another example of an illustrative vehicle-cloud system. In this illustrative example, the V2C talks to an exemplary cloud computing resource capable of cloud-based processing 192. In this example, the cloud computing resource can perform any requested computation.

For example, without limitation, the cloud computing resource may use one or more OEM provided optimization algorithms 196. These algorithms may be stored and/or updated from a site-based database 198 that the OEM updates as needed. The computing resource 192 can also draw on data from across the cloud 194 as needed to complete the computation.

By tapping the power of cloud-computing, the vehicle computing system, V2C and, in this example, powertrain control, can be optimized to promote fuel efficiency. Since it would take a long time (in computer processing terms), for the V2C to contact the algorithm site 198, gather the necessary data from the other remote sites 194, and then compute an optimization strategy, it may be easier to outsource this task to the cloud. The cloud computing resource should have lower latencies, faster access times, and more powerful computation ability. The resource can then send back a result understandable to at least the V2C system, in a fraction of the time it would have taken the V2C system to come up with the same result.

Figure 2:
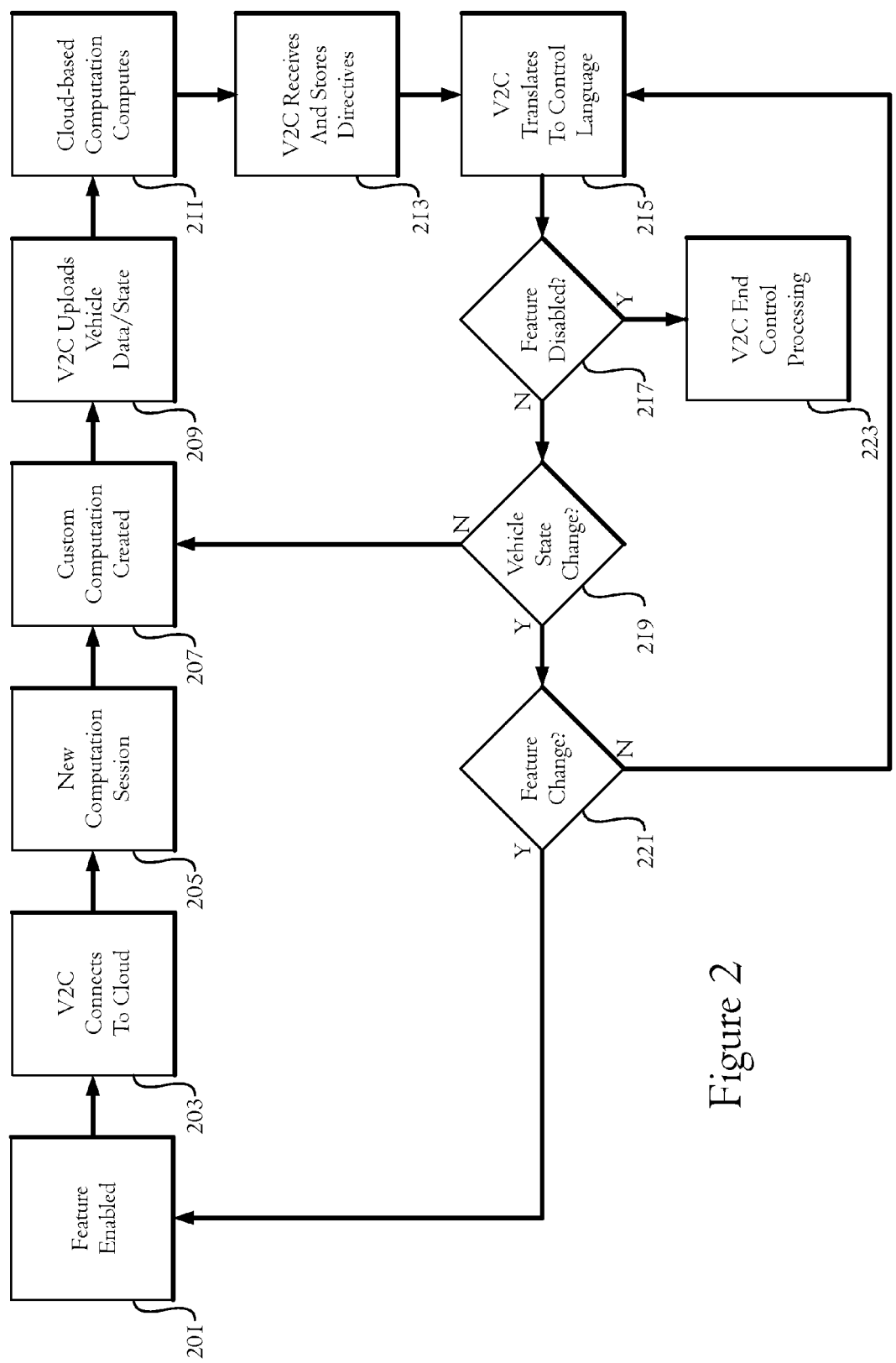
FIG. 2 shows an illustrative process for V2C cloud communication.

FIG. 2 shows an illustrative process for V2C cloud communication with respect to powertrain control. Although the illustrative examples deal with powertrain control, cloud computing can be used in the optimization of other vehicle systems in a similar manner.

In this illustrative example, a driver first enables a feature 201 that requires or uses cloud-based optimization. In this particular example, the feature relates to powertrain optimization. Since the optimization of a powertrain may require both numerous and intensive computations, in this example the computations are done off-board in the cloud and relayed to the V2C system. This also allows the computation system to access cloud-based data resources easily, such as, but not limited to, topography maps, weather data systems, etc.

Once the feature has been enabled, the V2C may initiate a connection to the internet 203 to connect to a process for performing a desired computation. In this example, the V2C uploads contextually relevant information 205. For example, with respect to a powertrain computation, it may be useful to know a vehicle location and a vehicle planned route. Other data may also be useful, and data may vary based on the computation being provided.

Next, in this embodiment, a requested cloud-based computation is created (or referenced, if already created and stored) 207. In this illustrative example, the computation relates to the strategy requested by the V2C. The computation may also need vehicle state/status inputs from the V2C, which can be uploaded from the vehicle 209. Next, in this process, the cloud based algorithm produces a high-level control directive 211. This is a general strategy for the powertrain, but, in this example, could not be fed directly to the powertrain.

This directive will be sent to the V2C 213, and will provide a strategy for powertrain control. Since the V2C has access to the present state of the powertrain at any time (as opposed to having to relay it to the cloud), the V2C may be in a better position to determine exactly when and if to implement the strategy. Also, deviances from a route, or disabling of a cruise control can change the state and desirability of the strategy, and the V2C is equipped to respond better to such changes due to relay time. The strategy could be put in control language in the cloud, but, at least with present transfer speeds, dropped packets and latencies, the user experience may be better served by having the V2C do the translation.

Once the V2C has the high-level directives, it can create control signals for use by the powertrain and send them on to the powertrain 215. These signals can be quickly received and implemented by the powertrain, and also can be adapted to changing road conditions/vehicle states. In this embodiment, the process then checks to ensure the feature is still enabled 217. For example, without limitation, if cruise control was disengaged, it might not make sense to tell the powertrain to accelerate the vehicle automatically to a certain speed. If the feature is disabled, then, in this embodiment, the process exits 223 and terminates implementation of the commands.

If the feature is still enabled, it's also possible that the vehicle state has changed significantly 219. For example, without limitation, the vehicle may have left the known route, or have entered a new route. Alternatively or additionally, a new feature may have been engaged, or the context of a feature may have changed (e.g., without limitation, cruise control now set at 35 MPH instead of 45 MPH). If such a context change has happened 221, a new session and control strategy may be needed.

If there is no state change, then the V2C may upload new data to the cloud in an effort to maintain a constant updating of the control directives. This fast, dynamic updating allows for more efficient usage of fuel, among other things. For example, it would also be possible to get a single control strategy and stick with that for a longer period of time, but if cloud access is available then the more dynamically the data can be refreshed the easier it will be to ensure that the strategy is as close to optimal as possible.

Figure 3:
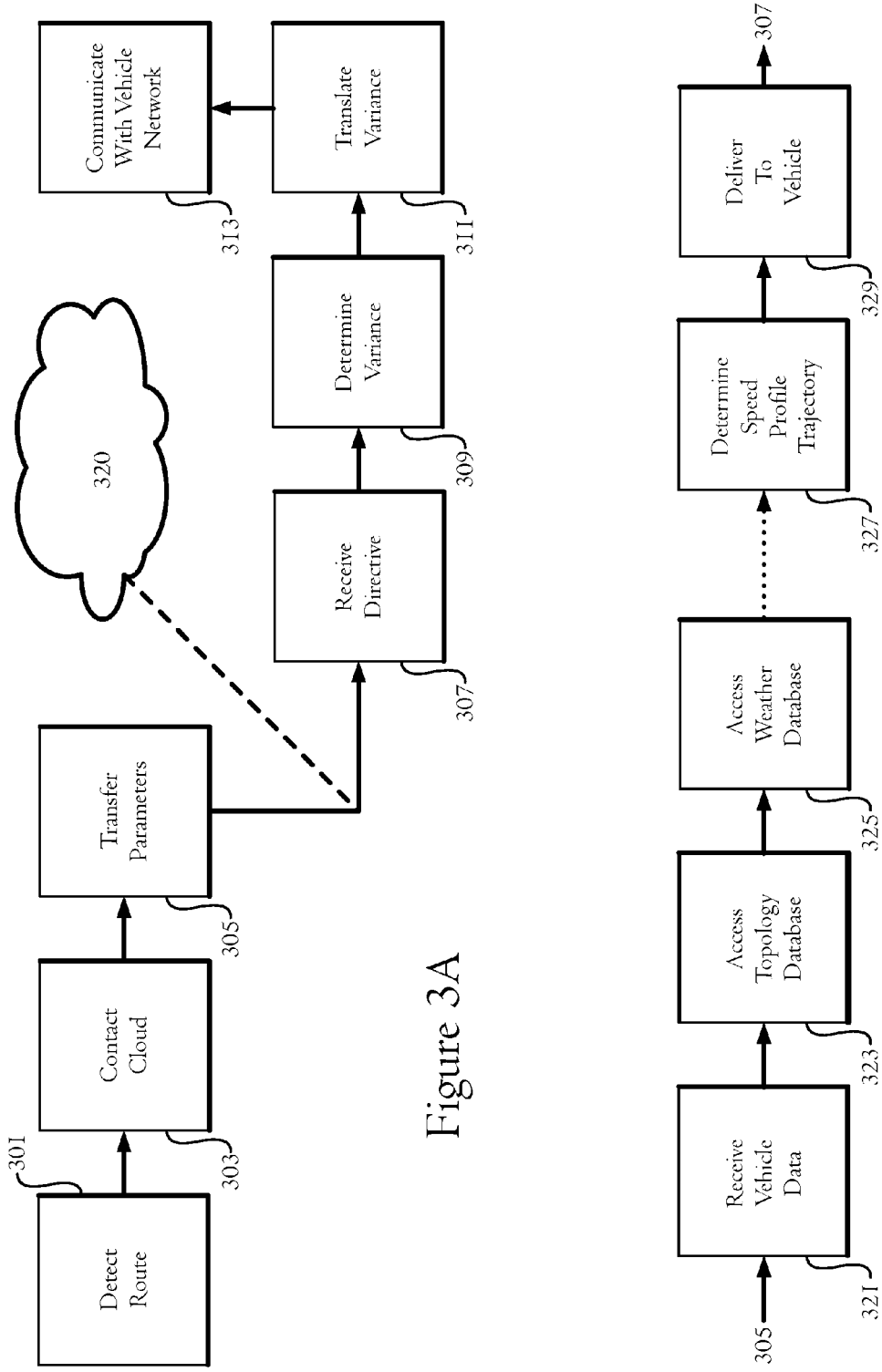
FIG. 3A shows an example of a vehicle computing system process for controlling a powertrain.
FIG. 3B shows an illustrative example of a cloud-based process for performing a vehicle requested computation.

FIG. 3A shows an example of a vehicle computing system process for controlling a powertrain. In this illustrative example, the computing system first detects a route 301. If the route is not entered or is unknown, the system may attempt to predict a route. This can also be done using cloud based computing, and is discussed in more detail with respect to FIGS. 4 and 5.

Once the route (and any other necessary parameters, set speed, etc.) are obtained, the system can contact the cloud 303. In this embodiment, the V2C will instruct the cloud to find an optimization strategy for cruise control for the vehicle. If the vehicle is allowed to deviate slightly in speed from the target speed set at the cruise control, it is possible to improve the fuel economy without sacrificing trip time. For example, without limitation, if the vehicle is going up a large hill and down the other side, along a route, it may be more fuel economical to slow the vehicle slightly on the upslope, and use free-roll and limited acceleration on the downslope, passing the set speed if needed to balance the time, and use less total fuel through the use of potential energy in the vehicle from the top of the hill. This can be seen to be more efficient than accelerating up the hill at the set speed, and then braking on the downslope, fighting the free energy given by gravity.

Once contact with the cloud has been established, the V2C can transfer the vehicle parameters needed by the computation process to the cloud 305. The cloud 320, will then perform a process described in more detail with respect to FIG. 3B and return to the V2C a set of high level directives 307 (in this embodiment, although direct commands could also be returned).

Any needed variance from the set speed can then be determined in terms of powertrain commands by the V2C system 309, and powertrain control instructions or information can be translated into a language that the powertrain comprehends 311. This information can then be communicated to the powertrain over a vehicle network such as, but not limited to, the CAN bus 313.

FIG. 3B shows an illustrative example of a cloud-based process for performing a vehicle requested computation. In this example, data is relayed to the process from the V2C system at step 305. The cloud based process then receives the vehicle data 321 and accesses needed databases or data stores. For example, in this particular implementation, a topology database 323 may be accessed to determined road topology over a route or portion of a route. Also, in this example, a weather database may be accessed to examine weather or weather forecasts over a route 325. Since there is almost an infinite amount of information available for access through the cloud, the V2C system can draw on almost any conceivable source of information needed to perform proper calculation.

Once the necessary data has been obtained, the system determines a speed profile for the route or portion of the route requested by the V2C 327. This data is then sent to the vehicle for use/processing 329.

FIG. 4 shows an illustrative example of a process for obtaining route information when the user has not input a particular route. In this illustrative example, a predictive process is used. The predictive process considers one or more factors relating to a current state of the user (e.g., without limitation, time of day, present location, etc.). Based at least in part on information congruencies relating to the considered factors, the system may attempt to predict or guess where the user intends to travel.

First, the process checks to see if a route has been user-input 401. If the user has input a route, no prediction is necessary, so the process can simply use the input route 403.

If there is no input route, however, the process may attempt to predict a route 405. Since the process may not actually know definitively where the user is headed, provided that the prediction attempt gives a result 407, the process may confirm a predicted destination 409. If the user concurs 411, the process can use a route to the predicted destination as a route to be traveled 413. If the user does not concur, the process can try predicting again, eliminating the first prediction from the set of possible destinations.

In at least one illustrative example, data recorders may log usage of a vehicle. While logging usage, they may also record times, weather data, other environmental data, dates of travel, etc. When sufficient data on a particular vehicle is gathered, predictive routing may be implemented. FIG. 5 shows one illustrative example of a prediction process.

In the example shown in FIG. 5, one or more pieces of driver data stored in a database are accessed 501. As noted, this data may have been gathered over the time, and stored with respect to a vehicle or even a particular driver.

Element 503 of FIG. 5 shows some illustrative non-limiting examples of factors that may be considered in determining a likely route. In this example, the process checks to see if a current time is known 511, if so, the process will factor time into the prediction 513, by, for example, determining where the driver or vehicle usually travels at the known time. Also, in this example, the process checks to see if a vehicle location is known 515. If the location is known, the process may consider location in a prediction 517. For example, if it is 6AM and the location is the user's house, and it is a weekday, there is a reasonable chance the vehicle may be going to work, school, etc. Other factors not shown may also be considered.

In one example of other factors, it is common that people do not always go to the same locations on, for example, weekends. But, if someone commonly heads to the movies on Sunday whenever it is raining, then entering the vehicle on a Sunday afternoon while it is raining may cause a prediction that the vehicle is headed to the movies. By considering a variety of geographic, temporal and/or environmental factors, suitable predictions of destinations can be made 505. Also, this allows a user to utilize systems such as the present invention's capabilities without requiring the user to input a destination every time a vehicle is used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
    receiving a requested powertrain control strategy at a vehicle computing system (VCS), including high-level directives for an upcoming route portion, which provide varying guidance for powertrain control under a variety of potential vehicle states; and utilizing the VCS to automatically control a powertrain based at least in part on a present vehicle state and the strategy aspects coincident with the state, including devising and implementing control-level commands for the powertrain.

2. The method of claim 1, wherein the powertrain control strategy is a cruise control optimization strategy.

3. The method of claim 2, wherein the cruise control optimization strategy includes a fuel usage optimization strategy.

4. The method of claim 3, wherein the fuel usage optimization strategy includes instructing the cruise control to deviate from a set speed.

5. The method of claim 1, further comprising, relaying one or more pieces of vehicle data usable in devising the optimization strategy.

6. The method of claim 5, wherein the vehicle data includes a vehicle route.

7. The method of claim 6, wherein the method further includes predicting a vehicle route if no route is currently available for relaying to the remote source.

8. The method of claim 1, further comprising detecting a change in the state of the vehicle; and initiating a new session with the remote computing source to receive a new powertrain control strategy based at least in part on the change in vehicle state.

9. The method of claim 1, further comprising repeating the requesting, receiving and utilizing steps periodically over the course of a route until at least one of a destination is reached or the powertrain feature is disabled.

10. A system comprising:

a vehicle computing system (VCS) operable to communicate with at least a remote server to obtain cloud based computing services;

wherein the VCS is configured to receive a requested powertrain control optimization strategy, including high-level directives for an upcoming route portion, which provide varying guidance for powertrain control under a variety of potential vehicle states, and wherein the VCS is further configured to automatically control a powertrain based at least in part on a present vehicle state and the strategy aspects coincident with the state, including being configured to devise and implement control-level commands for the powertrain.

11. The system of claim 10, wherein the powertrain control strategy is a cruise control optimization strategy.

12. The system of claim 11, wherein the cruise control optimization strategy includes a fuel usage optimization strategy.

13. The system of claim 10, wherein the vehicle computing system is configured to relay one or more pieces of vehicle data usable in devising the one or more optimization strategies.

14. The system of claim 13, wherein the vehicle data includes vehicle route information.

15. A computer readable storage medium storing instructions that, when executed, cause a vehicle computing system to perform the method comprising: receiving a requested powertrain control strategy at a vehicle computing system (VCS), including high-level directives for an upcoming route portion, which providing provide varying guidance for powertrain control under a variety of potential vehicle states; and utilizing the VCS to automatically control a powertrain based at least in part on a present vehicle state and the strategy aspects coincident with the state, including devising and implementing control-level commands for the powertrain.

16. The storage medium of claim 15, wherein the powertrain control strategy is a cruise control optimization strategy.

17. The storage medium of claim 16, wherein the cruise control optimization strategy includes a fuel usage optimization strategy.

* * * * *